E. R. LOCHMAN.
STONE AND METAL CUTTING AND CARVING MACHINE.
APPLICATION FILED OCT. 16, 1907. RENEWED OCT. 1, 1910.

1,199,801. Patented Oct. 3, 1916.
5 SHEETS—SHEET 3.

WITNESSES:

INVENTOR.
Emil R. Lochman
BY
ATTORNEY.

UNITED STATES PATENT OFFICE.

EMIL R. LOCHMAN, OF ST. LOUIS, MISSOURI.

STONE AND METAL CUTTING AND CARVING MACHINE.

1,199,801.  Specification of Letters Patent.  Patented Oct. 3, 1916.

Application filed October 16, 1907, Serial No. 397,702. Renewed October 1, 1910. Serial No. 584,947.

*To all whom it may concern:*

Be it known that I, EMIL R. LOCHMAN, citizen of the United States, residing at St. Louis, State of Missouri, have invented certain new and useful Improvements in Stone and Metal Cutting and Carving Machines, of which the following is a full, clear, and exact description, reference being had to the accompanying drawings, forming a part hereof.

My invention has relation to improvements in cutting and carving machines; and it consists in the novel details of construction more fully set forth in the specification and pointed out in the claims.

The present invention relates more particularly to a class of machines available for cutting and carving stone and metal in contradistinction to wood-carving machines, and among the objects of the invention may be stated the following: to provide suitable means for effectively and simultaneously controlling, and positioning over the stock operated on, the several tools operating on such stock, the tools being manipulated by devices mounted on a traveling carriage coupled to the tool-bar; to provide means for rigidly clamping the tools in position while operating on the stock; to provide special facilities for the drive-belts by which the tool-spindles are actuated; to provide special means for permitting the tool-bar to oscillate vertically to and from the work; to provide special means for automatically taking up the slack of the drive-belts; to provide special means for mounting and presenting the pattern to the tracer with a view of enabling the latter to traverse every portion of the contour of such pattern, thereby duplicating in every detail the configuration of the pattern on the stock operated on by the tools; to provide special means for controlling the stock-frame and the component parts thereof between which the stock is held; to provide special means for regulating the depth of insertion of the operating tools into the stockets or chucks of the tool-spindles; to provide special means for fastening the tools; to provide special means for exercising control over the positions of the tracer and tools in any particular direction relative to the pattern, and to the stock operated on; to provide special means for the accommodation of a suitable reverse cutter attachment, that is to say, an attachment capable of producing reverse counterparts of a given pattern; to provide special means for feeding water to the tools; and lastly to provide further and other details the advantages of which will be fully apparent from a detailed description of the invention which is as follows:

Referring to the drawings, which show only a portion of the full length of the machine, both ends of the machine being alike, 1, represents one of the hangers from which is suspended the drive-shaft S, carrying a pulley 2 from which leads a drive-belt B to any source of power (not shown). Disposed along the drive-shaft are a series of drums 4, over each of which passes the tool-driving belt or "drive" 5, the forward end of the "drive" passing around the pulley 6 of the tool spindle hereinafter more particularly referred to. Before reaching the tool-spindle, the drive traverses the pulleys 7, 8, 9, 10, and 11, mounted on special frames which allow for the vertical oscillations to which the tool-supporting bar $t$ and its supporting oscillating arms $a$ are subjected during the progress of the work. The arms $a$ are coupled together in the rear by piping $c'$ and are susceptible of horizontal oscillation about the central rocker tube or hollow-shaft $c$, itself mounted rotatably in blocks or bearings $d$ capable of forward and backward reciprocations on the ledges or ways $e$ formed on the supporting standards E.

Figures 1, 10:
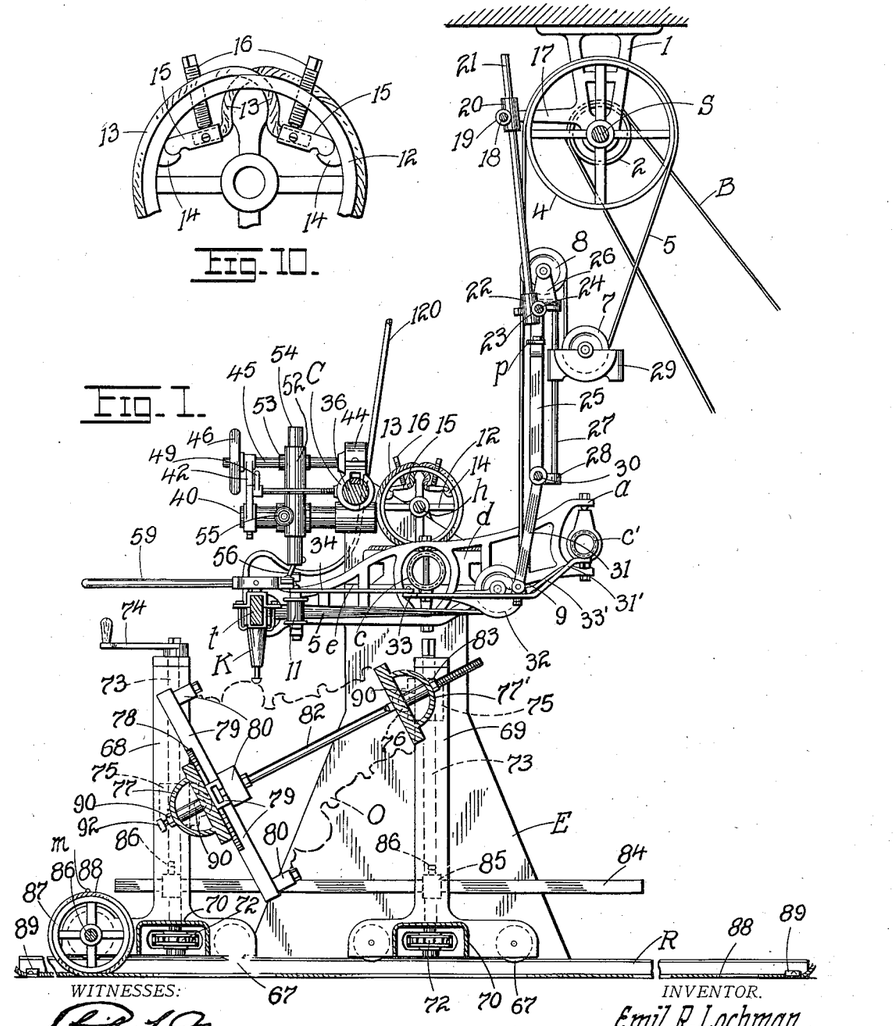
Figure 1 is a transverse vertical section of the machine on the line 1—1 of Fig. 2.
Fig. 10 is an enlarged sectional detail showing the mode of fastening the operating cords of the wheels which are coupled to the sliding bearings of the tool-frame.
Figure 2:
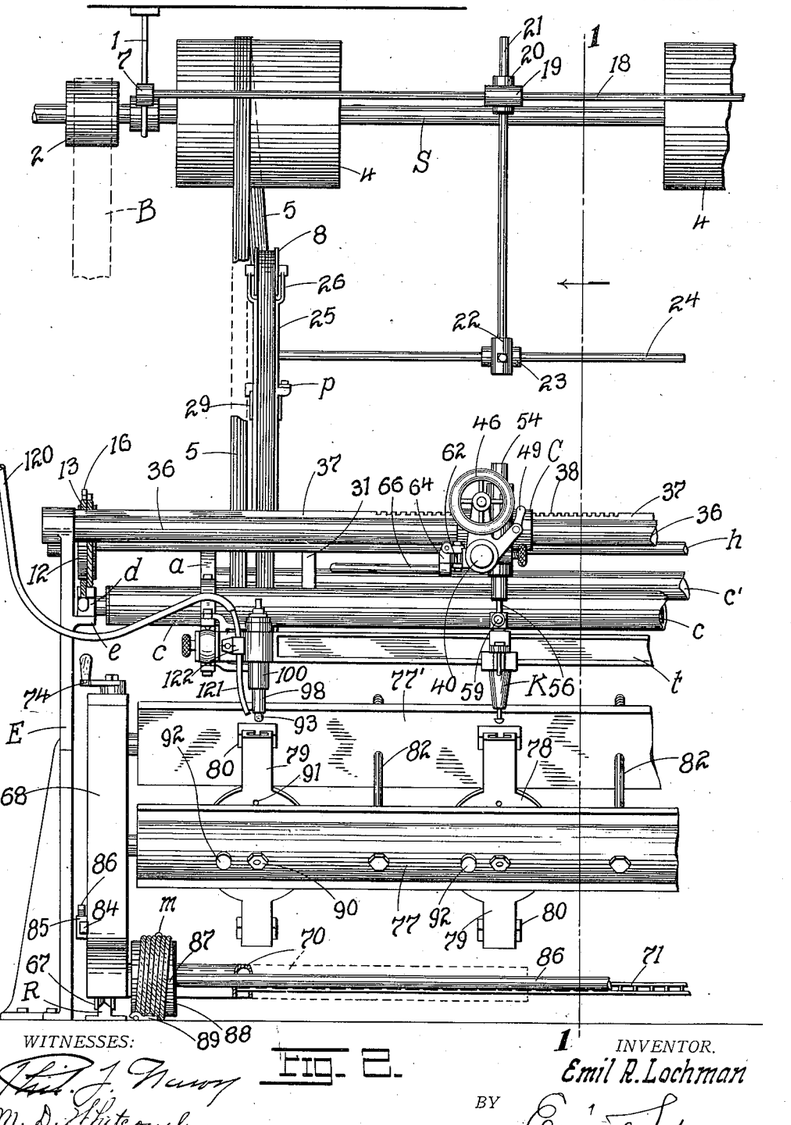
Fig. 2 is a front elevation thereof (the parts being broken a little short of the opposite end of the machine)
Figures 11, 12, 13, 14, 15, 16, 17, 18:
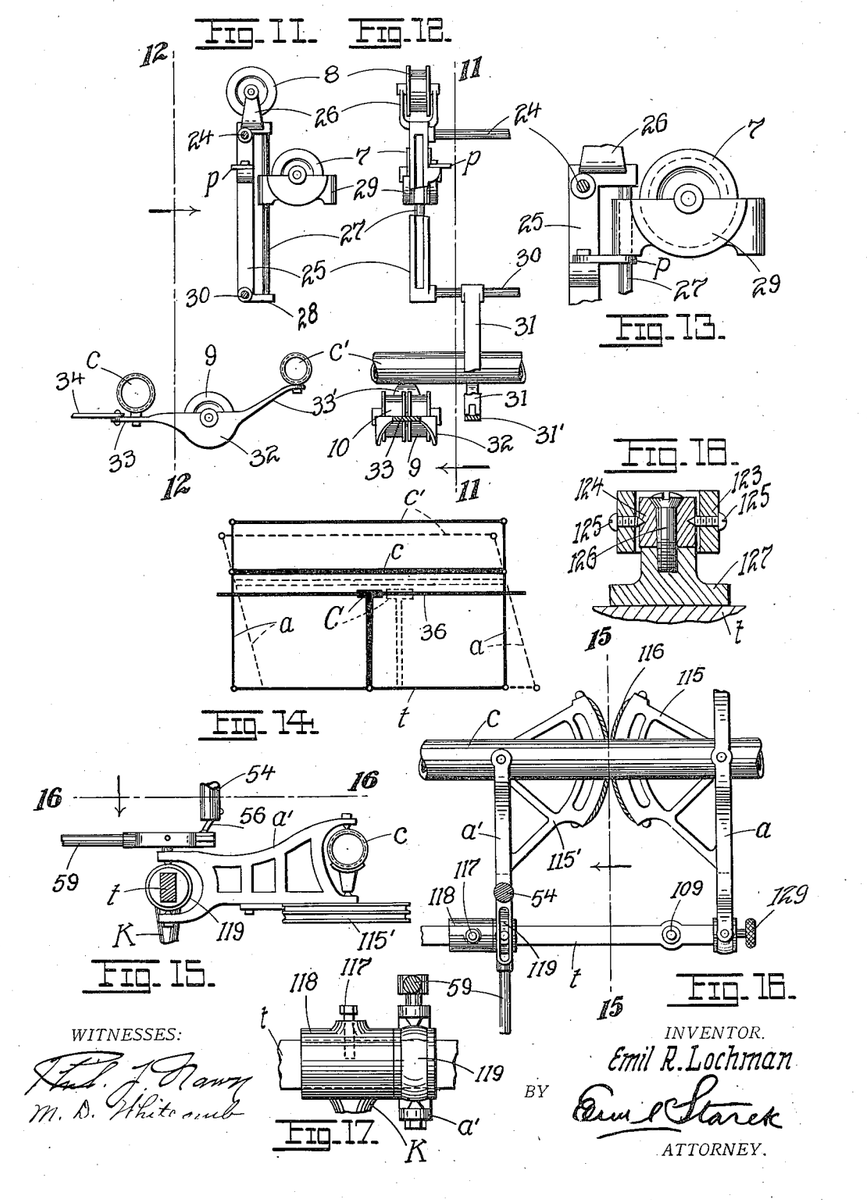
Fig. 11 is a vertical cross section on the line 11—11 of Fig. 12 of the upper part of the linked frame over which the drive-belt passes.
Fig. 12 is a vertical longitudinal section on the line 12—12 of Fig. 11.
Fig. 13 is an enlarged side view of the upper end of the linked frame showing the manner of suspending the casing of the gravitating pulley.
Fig. 14 is a diagrammatic view showing the manner in which the tool-frame folds upon a movement of the tool-frame-shifting carriage with a shifting of the carriage to one side of its central position.
Fig. 15 is a vertical transverse section on the line 15—15 of Fig. 16 taken through the tool-frame at a point within the reverse cutter.
Fig. 16 is a top plan of Fig. 15 and a section on the horizontal line 16—16 of said figure.
Fig. 17 is a front view of the socket carrying the tracer as used in conjunction with the reverse cutter.
Fig. 18 is a sectional detail on the line 18—18 of Fig. 4.

Mounted on a shaft $h$ at the top of each standard E is a wheel 12 having sections of cable or rope 13, 13, wrapped around its periphery from opposite directions, the outer ends of the cables being secured to the ends of the blocks $d$. It is obvious of course that horizontal pressure or draft on the rock-shaft $c$ in either direction will cause the latter with its tool-bar $t$ to move backward or forward over the ways $e$, the bearing blocks winding up one cable 13 about the wheel 12 while permitting the opposite cable to unwind from the wheel, the cable connection described being akin to a rack-and-pinion. The manner of securing the inner ends of the cable 13 to the wheel 12 is immaterial, though I prefer the employment of suitable keepers 14 formed on the wheel and engaging the terminal hooks 15 on the cables, suitable tightening bolts or screws 16 serving to hold the cables taut (Fig. 10). Since the drive 5 traverses the pulleys 7, 8, 9, 10, 11, during the vertical oscillations to which the tool-bar $t$ is subjected about the axis of the rock-shaft $c$, and during any horizontal reciprocations with any lateral oscillations of the arms $a$, it follows that a special frame must be improvised to accommodate the drive 5 under these conditions without impairing the speed of the drive and without undue binding or straining of the several parts. This frame may be described as follows: Projecting forward from the hangers 1, are bracket-arms 17 between which is mounted a rod 18 over which are loosely passed the sleeves 19, each sleeve being provided with a right-angularly disposed open-ended socket 20 through which loosely passes a rod 21, the lower end of said rod being coupled to the socket 22 of a similar sleeve 23 snugly embracing a parallel rod 24. The opposite ends of the rod 24 terminate in the adjacent members of the vertical pair of arms 25, 25, between whose upper terminals the pulleys 8 are mounted. The pulley 8 itself is carried between the members of the bracket 26 at the upper end of said arm, a suitable rearwardly disposed guide rod 27 extending from the bracket 26 to a lug 28 at the base of said arm, the rod serving as a guide for the vertically sliding casing or pulley-block 29 in which is mounted the pulley 7 (Figs. 1, 11). Between the lower ends of the pairs of arms 25, 25 disposed on opposite ends of the machine is mounted a rod 30 from which extends pivotally forward a link 31 coupling pivotally to an intermediate point of a second link 31' whose opposite ends are respectively hinged to the under sides of the pipes $c$ and $c'$.

The casing 32 housing the pulleys 9, 10, is provided with a front extension or arm 33 pivotally coupled to the pipe $c$ and to the adjacent end of a link 34, and with a rear extension or arm 33' hinged to the pipe $c'$ (Fig. 11). The forward end of the link 34 has mounted the pulley 11 whose spindle is coupled by means of a link 35 to the adjacent swinging arm $a$ between the outer ends of which the tool-bar $t$ is disposed. Of this linked "frame" the parts are all movable with the exception of the rod 18; and as the arms $a$ carrying the tool-bar $t$ oscillate up and down, the rods 21 play loosely through the sockets 20 of the sleeves 19. As the rear of this frame rises, the slack in the belt 5 is taken up by the gravitating casing 29 which freely slides along the rod 27; and as the rear of the frame drops, the casing 29 is pulled up, so that the latter not only accommodates itself to the movements of the tool-frame but becomes an automatic belt tightener, taking up any slack in the belt from any cause whatsoever. As the tool-bar $t$ reciprocates longitudinally by reason of any horizontal oscillations to which the arms $a$ may be subjected, the jointed connection between the parts 33, 34, will allow for such oscillation.

The tool-bar $t$, as in many prevailing carving machines is susceptible of bodily vertical oscillation to and from the stock, by virtue of the oscillation imparted to the arms $a$ about the axis of the rock-shaft $c$ about which they are gripped, and about which they are susceptible of independent oscillation in a horizontal plane; but in the present invention special provision is made for actuating the tool-bar with a view of positioning the tools on the stock in a lateral, backward and forward, and vertical direction, this being accomplished through the instrumentalities of means which control the position of what is here termed the "carriage," or the traveling member to which the tool-bar is coupled.

Figures 4, 5:
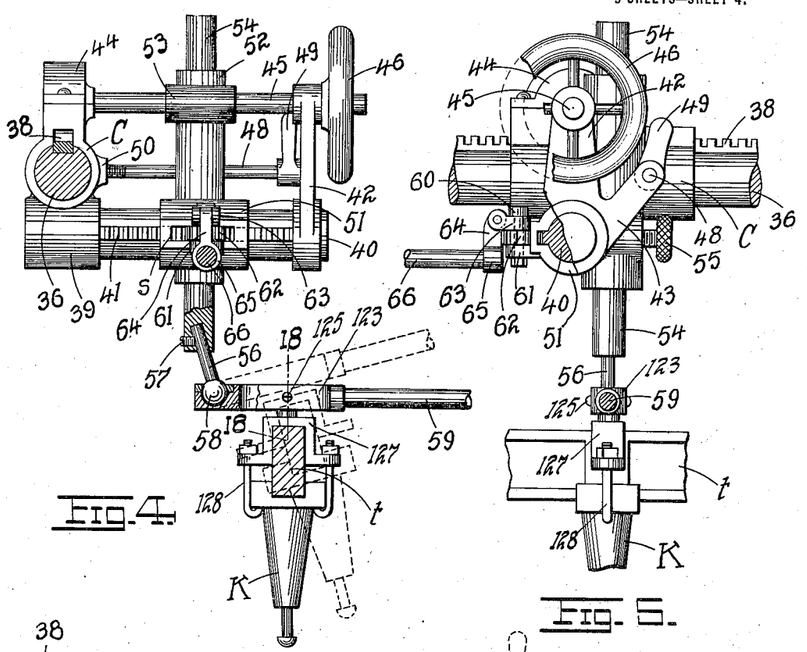
Fig. 4 is a vertical transverse section on the line 4—4 of Fig. 3.
Fig. 5 is a front end view of Fig. 4, with parts broken away.
Figure 6:
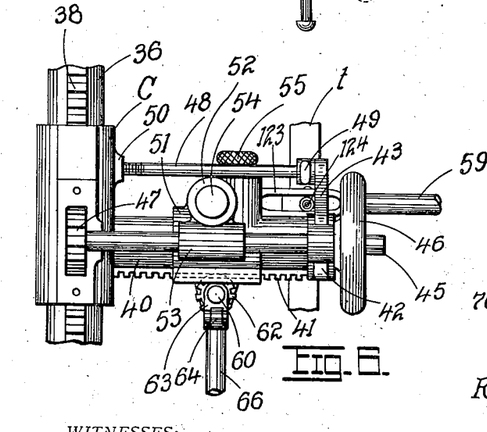
Fig. 6 is a top plan of Fig. 4.
Figure 7:
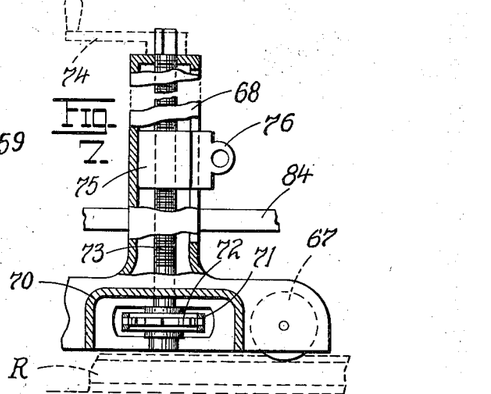
Fig. 7 is a vertical sectional detail showing the interior arrangement of the hollow staff carrying the movable support or nut by which the necessary inclination is imparted to the stock mounted on the stock-frame.

I will now described the carriage and the means by which it, and the tool-bar are actuated and controlled to accomplish the purposes here stated. Mounted rigidly between the standards E, E (it being remembered that only one end of the machine is here shown, and that another standard similar to the one illustrated is at the opposite end of the machine) in front of the axis of rotation ($h$) of the wheels 12, and in front of and above the axis of rotation of the rock-shaft $c$, is a rack-rail or bar 36 provided with a rib 37 equipped with a proper complement of teeth 38. Along this rail is adapted to reciprocate the carriage C from the bottom boss 39 of which projects forward an arm 40 having a laterally disposed rack 41 (Fig. 4). The end of the arm 40 carries a bearing or bracket 42 from the base of which diverges a supplemental bracket or arm 43. Mounted between the upper end of the arm 42 and a bearing 44 of the carriage is a shaft 45 terminating at its outer end in a hand-wheel 46 and at its inner end within the bearing 44 in a pinion 47 whereby, upon turning of the hand-wheel in either direction, the said pinion engaging the teeth 38 causes the carriage C to be shifted longitudinally along the rail 36. The arm 43 supports one end of a clamping screw 48 provided with a handle 49, the inner end of the screw passing through a boss or bearing 50 of the carriage and engaging the wall of the rail 36 whereby the carriage may be tightly clamped to the rail by the screw, once the carriage has been shifted to its proper position on the rail. Adapted to be shifted backward and forward along the rack-arm 40 is a laterally projecting sleeve 51 which forms the basal portion of a hollow tubular bearing 52, the latter having an upper lateral sleeve 53 loosely embracing, and guided by the shaft 45, the parts 51, 52, 53 constituting one piece and moving as a unit for any reciprocations imparted to the sleeve 51. The tube 52 serves as a bearing for the vertically adjustable rod or plug 54 which can be, when once properly adjusted within the bearing, securely clamped in position by the screw 55 (Fig. 5) carried by the tube 52. The base of the rod 54 is provided with a forwardly inclined socket which receives one end of a rigid coupling pin 56 secured in the socket by the screw 57, the lower end of the pin terminating in a spherical head 58 engaging a socket at the end of the short arm of a vertically and horizontally oscillating lever 59 coupled to the tool-bar $t$ immediately over the tracer tool K. The head 58 thus forms a joint about which the lever 59 may freely oscillate, said lever being used to exert (when seized by the operator) the necessary pressure against the stock operated on by the tools, as more fully hereinafter to be referred to.

Mounted rotatably on a stud or pin 60 supported by the lug 61 formed on the sleeve 51, is a pinion 62 which is free to engage the rack-teeth 41 through an elongated peripheral slot $s$ formed in the sleeve 51, the pin being loosely embraced immediately above the pinion and between it and the head of the pin (Fig. 5) by a horizontally oscillating ring 63 provided with ears between which is pivotally suspended a pawl 64 adapted to engage the pinion when said pawl hangs vertically suspended. The lower end of the pawl terminates in a socket 65 which receives a horizontal lever 66. It is apparent from the connections just described that if the lever 66 be raised vertically sufficiently to disengage the pawl 64 from the pinion 62, and then given a horizontal movement about the pin 60 as an axis, no rotation will be imparted to the pinion; but supposing the parts to be in the position as shown in Fig. 5, with the pawl 64 in engagement with the pinion 62, then by swinging the lever 66 backward or forward (or to the right or left if viewing Fig. 4), rotation will be imparted to the pinion, and this in turn engaging as it does the teeth 41 will move the sleeve 51 and its bearing 52, backward or forward along the arm 40, depending of course on which direction the lever 66 is swung. The operator can thus impart a series of rotations to the pinion 62 in proper direction by giving the pinion a turn, then releasing the pawl by raising the lever then swinging the lever back to secure a new purchase on the pinion by dropping the pawl back into engagement with the pinion, and so on, very much on the order of a pawl and ratchet connection. The lever 66 thus determines the relative position which the axis of the rod 54 to which the coupling pin 56 is secured, shall occupy, and hence determines the position of the axis of oscillation (joint 58) of the tool-bar-controlling-lever 59 from the vertical plane passing through the axis of vertical oscillation of the arms $a$ from which the tool-bar $t$ is suspended. It likewise determines the position of said joint 58 relative to the axis of the rail or bar 36.

The stock-frame, that is, the frame by which the pattern and stock are supported is characterized by features of construction which allow of the ready presentation to the tools, of every portion of the contour of the pattern to be reached by the tracer, with a view of accurate reproduction of the pattern on the stone or metal stock operated on by the tools. The composition of the stock frame is substantially as follows: Mounted on rails R disposed adjacent to, and between the standards E, and at right angles to the general length of the machine, and supported on wheels 67 are the front and rear pairs of hollow staffs 68, 69 respectively, the members of each pair being connected at the bottom by an inverted channel bar 70 in which is housed a sprocket-chain 71 connecting the sprocket wheels 72 carried at the bases of the screws or screw-rods 73 mounted in the staffs, the upper end of the screw terminating in a square head adapted to be engaged by the socket of a removable handle 74. The cross-section of the staffs 68, 69 is substantially U-shaped or of channel form (the channels facing each other) and along the screw 73 of each staff is mounted a nut 75 which is provided with a lateral bearing 76. Between the bearings 76, 76 of the outer or front pair of staffs 68 is rotatably mounted a longitudinally disposed platform or head-chuck 77 (having an arched exterior and a flat base and virtually a half cylinder in cross-section) provided with a series of axially rotatable spiders composed of the disks 78 and radiating arms 79, the arms of the spiders being suitably grooved or channeled out for the reception of the adjustable clamping blocks 80 between which the stock or pattern O is held. Projecting from the chuck 77 are a series of spacing members or rods 82 whose free ends pass loosely through a tail-chuck or follower 77' similar to the head-chuck 77, the flat side of this follower 77' bearing against the adjacent ends of the stock and pattern and forcibly held in contact therewith by the tightening or clamping nuts 83 passed over the outer screw-threaded ends of the rods 82. The member 77' is likewise rotatably mounted between the nut-bearings 76 carried by the nuts 75 operating on the screws 73 in the rear pair of staffs 69. The adjacent members of each pair of staffs 68, 69 are coupled on the side by a spacing bar 84 passing loosely through bearings 85 to which it may be tightly clamped by a screw 86. The forward or outer wheels of the outer pair of staffs 68 are connected by a shaft 86 at each end of which is mounted a drum or pulley 87, the said drum having wrapped about it a cord or cable 88 (secured by a central staple *m*) whose opposite ends pass off the drum in opposite directions and are secured to the floor by means of clamps 89.

The chucks 77, 77' and rods 82 virtually couple the front and rear pairs of staffs 68, 69 together, the greatest distance between the staffs being when the rods 82 are perpendicular to both staffs. In Fig. 1 the rods are inclined about 30 degrees to the horizontal. If now the operator should desire to raise the rods say to a horizontal position (the stock and pattern of course oscillating accordingly) he first loosens the rear set of clamping screws 86 so as to release the staffs 69, 69 from the bars 84. By now turning the handle 74 applied to the screw of one of the front staffs in proper direction to elevate the nuts 75 on the front pair of screws, it follows that the raising of the nuts will necessarily elevate the chuck 77, in which elevation the rods will gradually force the standards 69 rearwardly, and themselves assume a horizontal position or one perpendicular to both sets of staffs 68, 69. Should the operator on the other hand desire to drop the front ends of the rods (shown in Fig. 1) so as to cause the same to assume a greater angle with the horizontal, he tightens the rear set of screws 86, and loosens the front set (those on the staffs 68); then by turning the crank 74 to gradually lower the nuts 75, the staffs 68 will travel rearwardly on their rails R, being drawn in this direction by the dropping or downward oscillation of the chuck 77. In their travel, the staffs 68 will of course impart rotation to the shaft 86 which in turn will rotate the drum 87 causing the opposite wraps of the cables 88 to correspondingly and respectively wind on and unwind from the drums. The drum and cable arrangement here shown of course insures for the staffs a travel in lines perfectly parallel with the length of the machine so that there can be no deviation in the direction of the general axis of disposition of the stock and pattern operated on. In practice of course either pair of staffs 68, 69 may be loosened from their spacing bars 84, and the crank be applied to the screw 73 of either staff, the loose pair always conforming itself to the position which the inclination of the rods 82 shall determine for it. By thus inclining the pattern (and stock) to any desirable position, any portion of its surface (no matter what its configuration) may be presented to the tracer and to the cutting tools. In addition to this adjustment the spiders carrying the pattern and stock are rotated from time to time about spindles 90, the arc through which the parts are thus rotated being gaged by the spacing openings 91 of the disk 78 through which is passed a plug or pin 92 to keep the spider from accidental turning. It is apparent therefore that from the various inclinations and rotations which may be imparted to the stock and pattern on the stock-frame, any available portion of the area of such pattern and stock may be presented to the tools (including of course the tracer).

Figures 3, 8, 9:
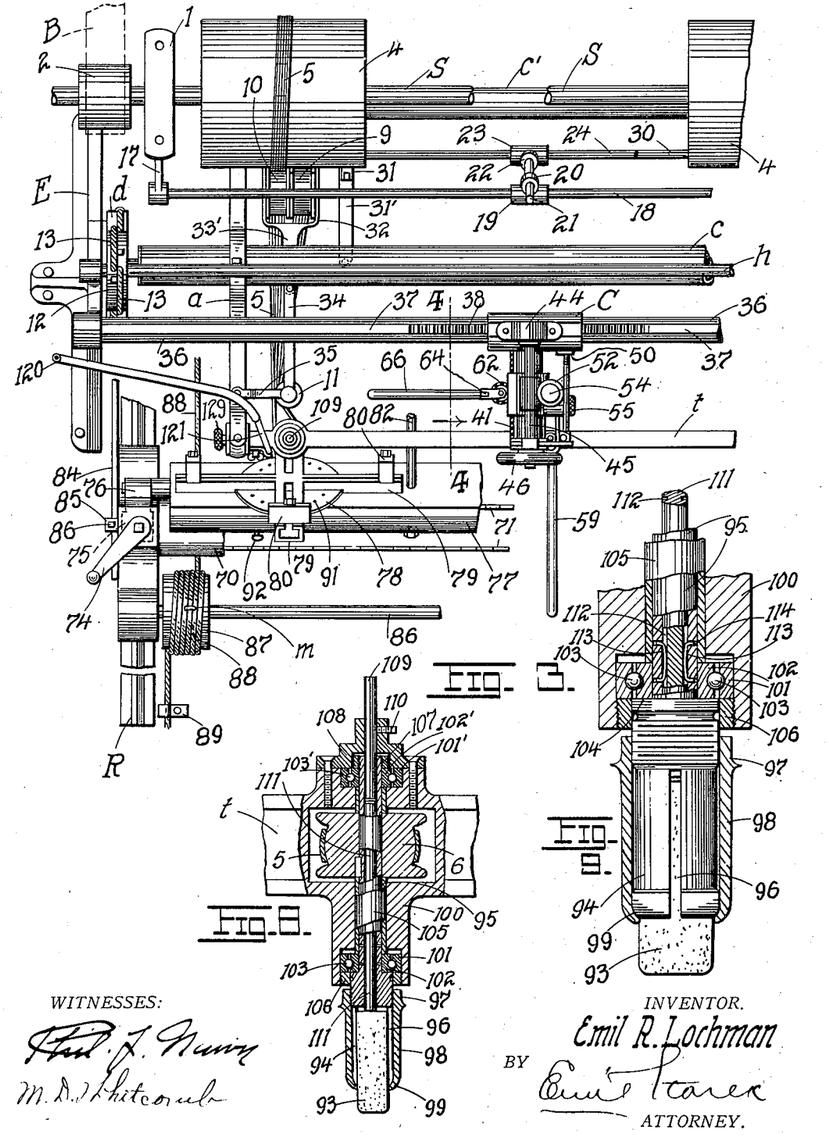
Fig. 3 is a top plan of the machine.
Fig. 8 is a middle longitudinal section of the tool spindle.
Fig. 9 is a similar enlarged section of the operating end of the tool-spindle.

As stated at the outset, the present machine is designed to cut and carve on stone and metal stock, and naturally requires a tool or bit of hard texture to accomplish its purpose. I accordingly employ a carborundum tool 93, mounting the same in a socket or chuck 94 at the end of the hollow tool-spindle 95, said spindle having keyed thereto the belt-pulley 6 over which the "drive" 5 passes. The socket 94 has yielding walls or members resulting from the longitudinal slots 96 formed in said walls, the base of the spindle above the socket being screw threaded, said screw-threaded portion having passed over it a clamping nut 97 with which is integrally formed a sleeve 98 terminating in a taper 99. As the nut is forced upward the tapered end of the sleeve contracts or closes the yielding members of the chuck, causing them to close over the tool and tightly grip the same. The tool-spindle is mounted in the tool-bar t as shown (Fig. 8) the latter being provided with a depending hollow boss 100 serving in a measure as a casing for the spindle, the bottom of the inner surface of the boss being suitably chambered to receive the annular bands 101—102 between which is formed a circular race-way for the ball bearings 103, the inner band 102 resting on a shoulder 104 formed on the spindle, and its upper edge bearing against the base of a bushing 105 interposed between it and the bottom of the pulley 6. The outer band 101 rests on a ring 106 screwed into the bottom of the boss 100. At the upper edge of the tool-bar t is formed a pocket for the reception of the annular bands 101', 102', also furnishing a race-way for the balls 103', the inner band 102' being held down by a nut 107 screwed to the spindle, the outer ring 101' being held in place by a cap-piece 108 secured to the tool-bar. Passed through the cap-piece 108 is an adjustable rod 109 held in position when once adjusted by a screw 110, the purpose of said rod being to limit the position of the adjustable stem 111 movable longitudinally through the bore of the spindle, the stem being provided with diametrically opposite longitudinal grooves 112 which are automatically engaged by the spring locking keys 113 disposed along the inner wall of the spindle. These keys are U-shaped springs, the arms of the springs being supported in sockets or openings 114 formed in the spindle walls, the bases of the springs entering the slots or grooves 112 of the stem when the latter is inserted into the spindle. The keying or locking of the stem to the spindle permits the stem to rotate with the spindle and with the tool, so that the spindle, the tool, and stem rotate as a unit. The stem 111 obviously limits the depth of insertion of the tool 93 into the socket or chuck of the tool spindle, the stem in turn being adjusted by the adjustment of the rod 109 which serves as an abutment or stop for the stem.

Under ordinary and prevailing operations of the machine, a lateral swing or oscillation of the tracer (that is, to the right or left of the operator facing the machine) is accompanied by a corresponding oscillation of the tools, the tool-bar t responding to the lateral or horizontal sways imparted to the arms a about the pivots on the rock shaft c.

In some cases however it is desirable, while the tracer K is making a sweep in one direction that the tool spindles shall sweep in a diametrically opposite direction. This operation is resorted to where it is desirable to produce a reverse counterpart of the design or pattern traced by the tracer. I accomplish this result by a reverse-cutting attachment or reverse cutter which may or may not form a permanent attachment for the machine. This attachment consists of the rocking segments 115, 115' respectively, secured directly to one of the arms a (a' being the tracer arm) the curved rocker-faces of the segments being united by two straps or cords 116, one end of each strap being connected to one end of one rocker-face and the opposite end to the opposite end of the opposite rocker-face, the rocking faces under the circumstances acting as two gear-wheels. While the reverse cutter is in engagement, the coupling pin 117, connecting the socket 118 of the tracer (loosely enveloping the tool-bar t) to the tool-bar t, is removed, thereby permitting the tracer tool to sweep horizontally in one direction while the tool-spindles are sweeping in the opposite direction. It thus becomes possible with a single pattern or design to not only produce under normal operations of the machine, a duplicate carved copy thereof, but upon coupling the reverse cutter, to produce a reverse counterpart of such original design. To disengage the reverse cutter all that is necessary is to uncouple or detach the cords 116, and couple the tracer-arm a' to the tool-bar by restoring the pin 117, when the machine is again set to operate in the ordinary way.

The general character of the reverse cutter as described is well understood and no claim is made thereto, the same being shown to illustrate its manner of application to the present machine. Where the reverse cutter is employed the lever 59 is connected to a ring 119 loosely encompassing an extension of the tracer-socket 118. The ring 119 is an important feature as by means of it, the tool-bar t is at all times permitted to be turned about its axis so as to impart any desirable inclination to the tracer and tools, whether the reverse cutter is in commission or not, it being understood that the tool-bar t is rotatable in its bearings in the arms a, in which it may be set to impart any inclination to the tools by the clamping heads 129, a construction well known in the art. During the cutting operation the tools are supplied with the necessary quantity of water through the hose 120 terminating in a nozzle 121 secured to the tool-bar by a clamp 122.

The controlling lever 59 connected by the ball and socket joint 58 to the carriage C is coupled to the tool-bar as shown in Figs.

4 and 18, that is to say, it is provided near its fulcrum joint with an elongated loop 123 in which is suspended a collar or ring 124 by means of pointed pins or screws 125, the collar having inserted thereinto a screw 126 which is screwed into the boss of a strap 127 encompassing the top and sides of the tool-bar $t$, the tracer K being secured to the bar $t$ and the strap by hooks 128. Any other available mechanical connection of course would answer the purpose. By raising the lever 59 thus connected to the tool-bar $t$ it draws the latter (and the entire tool-carrier frame) after it, the tracer and tools having imparted thereto the necessary inclination by virtue of this movement (dotted position Fig. 4). A depression of the lever 59 would of course produce corresponding contrary results as must be obvious.

The operation of the machine may at this time be conveniently described: For the sake of convenience the parts $c$, $c'$ $a$ $t$, may be collectively denominated as the tool-frame or tool-carrier frame since it is this frame which carries the several tools. As a frame it is capable of rotation or oscillation in a vertical plane about the axis of the rock-tube or pipe $c$, and the arms $a$ $a$ and tool-bar $t$ thereof are capable of oscillation to the left and right (of the observer) that is laterally or horizontally in planes passing through said axis, in which lateral oscillations the tool-bar has imparted thereto longitudinal reciprocations parallel to said axis. These several movements however are not new as they are previously described in former patents. In the present machine however which is specially designed for operating on surfaces of great resistance such as stone and metal, it is essential that the tool-bar and tool-frame as a whole shall be as rigid as possible and to secure this rigidity the tool-bar is connected to the fixed rail 36 by the rigid connection represented by the carriage C and parts coupling the same to the tool-bar (Fig. 4); and while this connection is rigid it is at the same time adjustable. The adjustment again is not limited in direction to and from the rail 36 which serves as a rigid abutment against which the tool-frame may at all times brace itself, but may be effected in a direction parallel to the rail. The transverse adjustment is controlled by the lever 66, and the longitudinal adjustment by the shaft 45 and its pinion 47 engaging the teeth 38 of the rail. There is in addition a simultaneous control of the tool-frame in both directions effected by the horizontal oscillation of the lever 59 about its fulcrum, a fact which will be obvious from the following explanation: By swinging the lever 59 in a horizontal plane about its fulcrum 58 (Figs. 3, 4) every point thereof will describe the arc of a circle, and hence the tracer K and every tool 93 carried by the bar $t$ to which said lever is coupled will likewise describe an arc of a circle. The tool-bar $t$ will partake of a double movement namely a longitudinal movement corresponding in degree to the length of the sine of the arc traversed, and a transverse movement (or at right angles to the member $c$ or bar 36) corresponding to the versed-sine of said arc, or in other words of a combined rectilinear and circular motion. In this respect the rear member $c'$ of the tool-frame will correspond except that its movements will be opposite to those of the member $t$, the members $a$ $a$ oscillating conjointly in the same direction about their pivoted connections on the member $c$. In other words the parts $a$, $a$ $c'$ $t$ will behave like the sides of a parallelogram which is jointed at its corners, folding or unfolding according to the character of movement imparted to its respective sides, it being obvious that the two sides which are moved in opposite directions will approach or recede from one another according as the parallelogram is folded or unfolded (see diagram Fig. 14). If therefore the operator simply oscillated the controlling lever 59 horizontally without more, the tools would operate on the stock along arcs of circles. If however at the same time, the operator by manipulating the pawl-lever 66 actuates the pinion 62 to cause the sleeve 51 to shift backward and forward along the rack-arm 40 so as to impart a transverse movement to the tubular bearing 52 and rod 54 to whose pin 56 the lever 59 is jointed. it is obvious that now, not only will the tools describe arcs of circles with the oscillations imparted to the lever 59 about its center 58, but this center, together with the tools and the entire tool-frame will have imparted thereto a bodily transverse movement ("transverse" designating a movement to and from the operator, or to and from the rail 36, or across the width of the machine), the combination of the two movements causing the tools to traverse an areal section of the stock. Of course each tool may be regarded as oscillating about a center of its own, such center corresponding to the center 58 and being disposed mathematically on a line drawn parallel to the tool-bar $t$ and passing through the center 58 specifically identified with the lever 59 and the tracer K. This areal traverse under the circumstances of the combined movements described, naturally follows, since a body moving a given distance in one direction, and then in a direction transverse thereto will necessarily move over a surface represented by the products of the two distances.

In practice the operator seizes one lever (59) by one hand, and the other lever (66) with the other hand, and by deftly manipuulating both levers he can bring the tracer K (and hence the tools) to play over any portion of a limited area of the pattern and stock respectively. The magnitude of this area thus operated on will depend on the degree of the transverse movement which can be imparted to the sleeve 51 (a degree depending on the length of the ways or ledges e over which the tool-frame is designed to travel) and on the radial distance of the tracer K from the fulcrum joint 58. Necessarily therefore this area is quite circumscribed, and to enlarge it, it is necessary particularly with flat stock to shift the carriage C longitudinally along the rack-rail 36 to enable the operator to reach fresh surfaces, provided of course the pattern is considerable in dimensions. Small patterns and stock rotatably mounted, and the surfaces of which immediately exposed to the tools are limited and readily fall within the circumscribed area may be conveniently rotated from time to time about their spindles 90, so as to expose fresh parts to the tracer and tools until their entire surfaces have been gone over; but for patterns (and stock) of any considerable length, the carriage C must be moved along the rail or abutment 36 to enable the tools to reach fresh surfaces. Of course the longitudinal shifting of the carriage is accomplished by turning the hand-wheel 46 which, imparting rotation to the pinion 47 causes the carriage to move along the rail. In this movement the carriage moves the tool-bar t longitudinally with it, but as the distance between the tool-bar and rail is a fixed one for any given adjustment of the sleeve 51, and the bar t, by reason of the rigid connection interposed between it and the rail or abutment 36, can not approach said abutment in its longitudinal movements, it follows that, in order that the parallelogram a a c' t may fold or properly respond to such movement of the tool-bar, the rear member c' must move toward the member t (a result made possible because of the free movement of the tool-frame over the tracks or ways e under the circumstances), the members a a oscillating in proper direction in conformity thereto. This adjustment is shown diagrammatically in Fig. 14, which shows the carriage C moved to the right of its original position; and since the bar t was shifted the same distance, yet could not approach the rail 36 from which it is separated by a rigid connection, it followed that the member c' (and also shaft c) had to approach the member t to allow the parallelogram to partially close or fold, this folding being permitted because of the mounting of the parallelogram (tool-frame) on the sliding blocks d. The solid black lines in said Fig. 14 show the tool-frame when fully unfolded and when the arms a are at right angles to the members c' t; the dotted position shows the arms a a at an oblique angle to c' t, and c' nearer t, the distance between the rail or abutment 36 and the member t being constant (that is to say, constant for any predetermined adjustment between these two immediate parts). It follows therefore that the tool-bar may be shifted longitudinally and transversely along the stock by a horizontal sweep of the lever 59; it may be shifted transversely (that is to and from the operator) across the machine by the manipulation of the lever 66, (these two levers being connected through the sleeve 51, plug 54, and pin 56); it may be shifted longitudinally in a line forming an extension or continuation of its length by the manipulation of the shaft 45 and pinion 47 (Fig. 14). The tool-bar t may likewise be tilted upward or depressed (dotted parts Fig. 4) by raising or lowering the lever 59 in which event the entire tool-frame is not only oscillated about the axis of the hollow shaft c, but is drawn along the ways e to conform itself to the sweep of said lever; and it makes no difference in the general results where the reverse cutter (Fig. 16) is in commission, except that as the arm a' is oscillated in one direction the tool-bar oscillates in the opposite direction. By restoring the pin 117 the machine again operates in the ordinary way, and in practice the tracer K may be mounted as shown in Fig. 4 or as shown in Figs. 15, 16, 17. If it be desirable to raise the tool-bar to a point higher than that indicated in dotted lines in Fig. 4, this may be done by a proper raising or lowering of the plug or rod 54 to which the fulcrum joint 58 is attached. Since the tubular bearing 52 and sleeve 53 are integral with the sleeve 51, these parts travel as a unit in any movement imparted to the sleeve 51 along the arm 40.

The carriage C, which may be regarded as composed of the parts lettered C, the overhanging arm 40, brackets 42, and 43, is rigid on the rail 36, it being impossible to turn thereon on account of the locked connection between the parts resulting from the interlocking of the teeth 38 with pinion 47, and on account of the rib 37.

For operating on a circumscribed area therefore, the tools are under perfect control by a proper manipulation of the levers 59, 66, which are capable of directing the tools to any point of such area. To enlarge the area of operation, the carriage is shifted in proper direction along the rail 36 and locked by the screw 48, when again the levers 59, 66 are brought into play. The lever 59 not only serves the operator in that he can exert the necessary pressure on the stock, but holding the lever as he does in his hand, he can feel whether the tools are being abused under an undue pressure; and when there is danger of breakage he can relieve the pressure somewhat. In order that the several tools may project the proper extent out of their sockets, he drives the rod 111 into the tool-spindle the required degree by tapping on the stem 109 (the screw 110 being first loosened) which may be provided if desirable with gage marks or a scale, the stem 109 always serving as a back-stop or abutment for the rod 111 and the tool 93 bearing against it.

The operation of the stock-frame has already been described, but a word or two may be added to supplement what has already been said. When the stock which is clamped between the head and tail-chucks is having one or the other end raised or lowered relatively to its opposite end, it is obvious that it sweeps in the arc of a circle. For this reason one set of staffs 68 (69) is loosened from its spacing bars 84, to allow the staffs to accommodate the sweep of the stock (this includes the pattern of course), the degree of movement of the staffs under the circumstances corresponding obviously to the versed-sine of the arc described by the oscillating end of the stock.

With the various movements and oscillations imparted to the tool-frame, the drive-belt 5 moves in conformity thereto, the linked-frame carrying the idlers 7, 8, 9, 10, 11 readily conforming itself thereto. With the vertical movements of the linked-frame the belt 5 is always kept taut by the weighted gravitating pulley block 29, which by the way may at any time be arrested if desired for any reason by the pivoted lug or ear $p$ carried by the frame, which lug is shown swung into engagement in Fig. 13.

Such structural features as may be shown but to which no specific reference has been made are well understood in the art and a description of them is here unnecessary. Since the transverse travel of the tool-frame can not exceed the length of the ways $e$, it obviously becomes necessary in order that the entire distance between the chucks 77, 77' be traversed by the tools, that the entire stock-frame be moved transversely on its rails R, R. This is done by hand, when it will remain held in any adjusted position by the cables 88.

It is to be understood that one of the underlying principles of the present machine is the control of the tool-frame and tool-bar in movements in three distinct directions, namely in an oscillation in one direction about a given axis, in a reciprocation or oscillation parallel to said axis, and in a transverse reciprocation to and from a line parallel to said axis; and while herein illustrated as being accomplished by devices actuated by the hands, it is obvious that any well known mechanical means actuated by water, air or steam may be substituted for the hand means specifically shown.

Having described my invention what I claim is:

1. In a carving machine, a suitable tool-carrier frame capable of a bodily reciprocating movement, a stationary member or abutment therefor, and means interposed between said frame and abutment for shifting the position of the frame relatively to said abutment, substantially as set forth.

2. In a carving machine, a tool-carrier frame capable of a bodily reciprocating movement, and of an independent oscillation in vertical and horizontal planes, a stationary member or abutment, and means interposed between the frame and abutment for shifting the position of the frame relatively to said abutment, substantially as set forth.

3. In a carving machine, a tool-carrier frame capable of a bodily reciprocating movement, and having a tool-bar capable of oscillation about a fixed axis in a given plane and of independent reciprocation parallel to said axis, a stationary member or abutment, and means interposed between the abutment and tool-bar for shifting the position of the frame relatively to said abutment, substantially as set forth.

4. In a carving machine, a tool-carrier frame capable of a bodily reciprocating movement and having a tool-bar capable of oscillation about a fixed axis in a given plane and of independent reciprocation parallel to said axis, a longitudinal stationary member or abutment disposed parallel to the axis aforesaid, and means interposed between the abutment and tool-bar and adjustable along said abutment, for shifting the position of the frame relatively to said abutment, substantially as set forth.

5. In a carving machine, a movable tool-carrier frame having four sides forming a parallelogram, a tool-bar forming one of the sides, capable of reciprocating longitudinally and in parallel with a line passing through the contiguous sides at equal distances from the tool-bar, a longitudinal stationary member or abutment disposed parallel to said line, and connections interposed between said abutment and tool-bar and fixed to the tool-bar but adjustable along the abutment whereby expansion and contraction of the parallelogram is possible upon reciprocation of the tool-bar, substantially as set forth.

6. In a carving machine, a movable tool-carrier frame having four sides forming a parallelogram, a tool-bar forming one of the sides, capable of reciprocating longitudinally or parallel to its length, and means for confining its reciprocations along a line disposed at a uniform distance from a fixed parallel line, the contiguous and opposite sides of the parallelogram conforming themselves to such reciprocations of the tool-bar, substantially as set forth.

7. In a carving machine, a tool-carrier frame capable of a bodily reciprocation and having a tool-bar capable of oscillation about a fixed axis in a given plane and of independent reciprocation parallel to said axis, a longitudinal stationary member or abutment disposed parallel to said axis and between it and the tool-bar, and connections interposed between the abutment and tool-bar and adjustable along the abutment, for shifting the position of the frame relatively to said abutment, substantially as set forth.

8. In a carving machine, a movable tool-carrier frame comprising a parallelogram one side thereof serving as the tool-bar, and means for constraining said tool-bar to a longitudinal movement at a uniform distance from a fixed line parallel therewith, whereby the side opposite the tool-bar is moved to and from said tool-bar to allow for the necessary oscillation of the contiguous sides during such longitudinal movements, substantially as set forth.

9. In a carving machine, a tool-carrier frame having a reciprocating movement, traveling bearings on which the same is mounted, suitable ways or tracks for the bearings, wheels rotatable about fixed axes having cords wrapped thereover and extending in opposite directions and secured to the bearings, a fixed abutment, and devices interposed between the abutment and tool-carrier frame for actuating the latter, substantially as set forth.

10. In a carving machine, a reciprocating tool-carrier frame rotatable vertically about a permanent axis, a tool-bar at one end of the frame, a drive belt, a fixed drive-pulley or drum mounted above the opposite end of the tool-carrier frame, a linked frame coupled to the tool-carrier frame and occupying a position between said tool-frame and drive pulley, a series of guide pulleys on said linked-frame around which said drive-belt passes, one of the pulleys being movably suspended from one of the laps of the belt whereby the latter is permanently tightened, and means on the linked-frame for guiding said suspended pulley, substantially as set forth.

11. In combination with a reciprocating tool-carrier frame composed of a longitudinal member, arms fixed thereto and capable of oscillation in planes parallel to said member, a tool-bar carried by said arms, a stationary longitudinal abutment disposed parallel to said longitudinal member, a traveling carriage mounted on the abutment and coupled to the tool-bar, and controlling devices on the carriage for adjusting the position of the tool-bar relatively to the abutment whereby a bodily movement is imparted to the tool-frame, substantially as set forth.

12. In combination with a reciprocating folding tool-carrier frame composed of a longitudinal member, arms fixed thereto and capable of oscillation in planes parallel to said member, a tool-bar carried by the arms, a stationary longitudinal abutment disposed parallel to said longitudinal member, a traveling carriage mounted on the abutment and coupled to the tool-bar, and controlling devices on the carriage for constraining the longitudinal movement of the tool-bar to a fixed distance from the abutment upon a movement of the carriage in either direction, whereby the longitudinal member of the tool-frame is moved to and from the abutment according to the direction of travel of the carriage, substantially as set forth.

13. In combination with a reciprocating tool-carrier frame composed of a longitudinal member, arms fixed thereto and capable of oscillation in vertical planes about the axis of said member, and also in horizontal planes, a tool-bar carried by said arms, a stationary longitudinal abutment disposed parallel to the axis of vertical oscillation of the tool-frame, a traveling carriage mounted on the abutment and coupled to the tool-bar, and controlling devices on the carriage for adjusting the position of the tool-bar relatively to the abutment whereby a bodily movement is imparted to the tool-frame, substantially as set forth.

14. In combination with a reciprocating tool-frame having a tool-bar capable of a combined rotary and longitudinal reciprocation, the longitudinal component of such combined movement being transverse to the reciprocation of the tool-frame, suitable independent devices coupled to the frame and coöperatively connected to each other for simultaneously effecting bodily reciprocations of the tool-frame and tool-bar in their respective directions whereby the tools traverse an area depending on the extent of said reciprocations, substantially as set forth.

15. In combination with a reciprocating tool-frame having a tool-bar capable of a combined rotary and longitudinal reciprocation, the longitudinal component being transverse to the direction of reciprocation of the frame, a stationary abutment, a lever interposed between said abutment and tool-frame for imparting reciprocation to the latter, and a second lever coöperatively connected to the first lever for imparting the necessary reciprocations to the tool-bar whereby the tools traverse an area conformable to said reciprocations, substantially as set forth.

16. In combination with a reciprocating tool-frame having a tool-bar capable of a longitudinal reciprocation transverse to the reciprocation of the tool-frame, suitable independent devices coupled to the frame and coöperatively connected to each other for simultaneously effecting the reciprocations of the tool-frame and tool-bar in their respective directions whereby the tools traverse an area conformable to said movement, substantially as set forth 17. In combination with a reciprocating tool-frame having a tool-bar capable of a combined rotary and longitudinal reciprocation, the longitudinal component being transverse to the reciprocation of the frame, a stationary abutment, a movable member interposed between said abutment and tool-frame and coupled to the frame, a controlling lever for actuating said movable member for imparting the necessary reciprocations to the tool-frame, and a second member coöperatively connected to the movable member for imparting the necessary reciprocations to the tool-bar, substantially as set forth.

18. In combination with a reciprocating and oscillating tool-frame having a tool-bar capable of a combined rotary and longitudinal reciprocation, the longitudinal component being transverse to the reciprocations of the tool-frame, a stationary abutment, a rigid support carried by the abutment, a movable member mounted on said support, a lever for shifting said movable member to and from the abutment, and a second lever fulcrumed to the movable member and loosely coupled to the tool-bar, whereby upon proper oscillations of the levers the necessary reciprocations are imparted to the tool-frame and tool-bar, substantially as set forth.

19. In combination with a horizontally reciprocating, and vertically oscillating jointed tool-frame having a tool-bar capable of a combined rotary and longitudinal reciprocation, the longitudinal component being transverse to the reciprocations of the tool-frame, a stationary abutment, a rigid rack-arm carried by the abutment and projecting toward the tool-bar, a sleeve mounted on the arm, a pinion on the sleeve, a lever for actuating the pinion and thereby shifting the sleeve along the arm, a member carried by the sleeve, a second lever having a ball and socket connection with said member and loosely connected to the tool-bar, whereby upon oscillations of the levers in proper directions the necessary reciprocations are imparted to the tool-frame and tool-bar, substantially as set forth.

20. In combination with a horizontally reciprocating, and vertically oscillating jointed tool-frame having a tool-bar capable of a combined rotary and longitudinal reciprocation, the longitudinal component being transverse to the reciprocations of the tool-frame, a stationary abutment, a rigid rack-arm projecting from the abutment toward the tool-bar, a sleeve mounted on the arm, a lever for shifting the sleeve along the arm, a rod or plug mounted in the sleeve and adjustable vertically therein, a second lever loosely coupled to the tool-bar and connected by a ball and socket joint to the adjustable rod, the parts operating substantially as and for the purpose set forth.

21. In combination with a reciprocating jointed tool-frame having a tool-bar capable of longitudinal reciprocation transverse to the reciprocation of the tool-frame, a rigid rail or abutment mounted in proximity and parallel to, the tool-bar, and a carriage movable along said rail and coöperatively connected to the tool-bar, substantially as set forth.

22. In combination with a reciprocating jointed tool-frame having a tool-bar capable of conjoint rotary and longitudinal reciprocation, the longitudinal component being transverse to the reciprocation of the tool-frame, a rail or abutment disposed parallel to the tool-bar, and a carriage mounted to travel on the rail and pivotally coupled to the tool-bar, substantially as set forth.

23. In combination with a reciprocating jointed tool-frame having a tool-bar capable of conjoint rotary and longitudinal reciprocation, the longitudinal component being at right angles to the reciprocation of the tool-frame, a rail or abutment disposed parallel to the tool-frame, a carriage mounted to travel on said rail, a lever loosely connected to the tool-bar, and a jointed connection between the fulcrum end of the lever and the carriage, substantially as set forth.

24. In combination with a tool, a head and tail chuck, suitable supporting staffs movable to and from one another, an operating screw in each staff, a nut traveling on said screw, means for effecting a hinged connection between the nuts and the respective chucks, means for imparting rotation to the screws at one end of the stock whereby the stock at that end shall be raised or lowered, and means for locking one of the staffs against movement to allow the opposite staff to shift in conformity to the sweep imparted to the stock, substantially as set forth.

25. In combination with a reciprocating tool-carrier frame capable of oscillation about a fixed axis, and of oscillation in planes parallel to said axis, suitable means connected to the frame for controlling said reciprocation by a force exerted in a line parallel to said reciprocation, and additional means for controlling said reciprocation by the available component of a force applied along an arc of a circle, substantially as set forth.

26. In combination with a reciprocating tool-carrier frame having a tool-bar capable of reciprocation transversely to the reciprocations of the frame, suitable independent devices coupled to the frame and coöperatively connected to each other for simultaneously effecting bodily reciprocation of the frame, and reciprocation of the tool-bar, substantially as set forth.

27. In combination with a tool, a head and tail chuck mounted in movable relation to one another and adapted to support the stock between them, means for moving one of the chucks and the stock about an axis of the opposite chuck, whereby the distance between the chucks adjusts itself to the arc described by the moving parts, substantially as set forth.

28. In combination with a tool, a head and tail chuck, supports therefor pivotally secured to the chucks, means for securing the stock between the chucks, devices for holding the supports in movable and adjustable relation to one another, and means for moving one of said supports about the pivotal axis of the other support as a center whereby the distance between the supports will adjust itself in conformity to the arc described by the moving support, substantially as set forth.

29. In combination with a tool-frame comprising a tool-bar capable of longitudinal reciprocation, a member disposed parallel to the tool-bar, and arms pivotally connecting the tool-bar to said member, a reverse cutter composed of two segments mounted pivotally on the aforesaid member and oscillating in opposite directions and respectively secured to two adjacent arms, one of said arms terminating in a socket loosely embracing the tool-bar, and a loose collar interposed between said arm and socket whereby the tool-bar is susceptible of independent axial rotation to impart any desirable angle to the tools, during the reciprocations of the tool-bar, substantially as set forth.

30. In combination with a tubular tool-spindle having a terminal socket for the reception of a tool, a stem inserted into the spindle and rotating therewith and bearing with one end against the tool, and a rod bearing against the opposite end of the stem and slidingly adjustable to and from the stem and serving as an abutment or stop for the stem to regulate the depth of insertion of the tool in its socket, substantially as set forth.

31. In combination with a tubular tool-spindle having a terminal socket for the reception of a tool, a stem having longitudinal parallel grooves, inserted in said spindle, spring keys mounted in the walls of the spindle and engaging the grooves aforesaid and locking the stem to the spindle but permitting longitudinal movement of the stem inside the spindle, one end of the stem bearing against the tool, and a sliding rod inserted into the opposite end of the spindle and bearing against the stem, substantially as set forth.

32. In combination with a pair of staffs adapted to travel back and forth, operating screws in the staffs, sprocket wheels at the bases of the screws, chains connecting said wheels, a second pair of staffs provided with similar screws and sprocket chains and wheels, a shaft connecting the first pair of staffs, drums on the shaft, cables wound about the drums and wrapped with their ends extending in opposite directions, means for securing the free ends of the cables, nuts traveling on the screws of the respective staffs, head and tail chucks hinged to the nuts of the respective pairs of staffs, and suitable spacing members or rods between the chucks, substantially as set forth.

33. In combination with a pair of staffs adapted to travel back and forth, operating screws in the staffs, sprocket wheels at the bases of the screws, chains connecting said wheels, a second similar pair of staffs and sprocket wheels and chains, spacing bars disposed between the adjacent members of the respective pairs of staffs for retaining the staffs at predetermined distances apart, means for permitting disengagement of the bars from their staffs, a shaft connecting the first pair of staffs, drums on the shaft, cables wrapped about the drums with ends extending in opposite directions, means for securing the free ends of the cables, nuts traveling on the screws of the respective staffs, head and tail chucks hinged to the nuts of the respective pairs of staffs, and spacing rods between the chucks, substantially as set forth.

34. In combination with a tool oscillating about a given center, a lever for controlling the movements of the tool along the arc of its oscillations, and a second lever in coupled relation to the first lever for shifting the center of oscillation in a direction transverse to the sine of the arc described by the tool, substantially as set forth.

35. In combination with a tool oscillating about a given center, a lever for controlling the movements of the tool along the arc of its oscillations, and a second lever in coupled relation to the first lever for shifting the center of oscillation of the tool in a direction corresponding to the versed sine of the arc described by the tool, substantially as set forth.

36. In combination with a tool oscillating about a given center, a lever for controlling the movements of the tool along the arc of its oscillations, and a second lever disposed in proximity to the first lever and at right angles thereto and oscillating in a plane substantially parallel to the first lever, and in coupled relation to the latter, for shifting the center of oscillation of the tool in a direction transverse to the sine of the arc described by the tool, substantially as set forth.

37. In combination with a tool oscillating about a given center, a lever for controlling the movements of the tool along the arc of its oscillations, and a second lever in coupled relation to the first lever for shifting the tool and its center of oscillation in a path transverse to the sine of the arc described by the tool, substantially as set forth.

38. In combination with a tool oscillating about a given center, a lever oscillating from the same center and controlling the movements of the tool in its oscillations, and a second lever in coupled relation to the first lever for shifting the center of oscillation of the first lever in a path transverse to the sine of the arc described by the first lever and the tool controlled thereby, substantially as set forth.

39. In combination with a lever capable of oscillation in different planes about a ball-and-socket joint, a tool secured to the lever a suitable distance from said joint, a second lever in coupled relation to the first lever for shifting the position of the joint in directions to cause the tool to traverse an area in its movements along a given plane, substantially as set forth.

40. In combination with a tool oscillating about a given center, a lever oscillating about the same center in a given plane and controlling the movements of the tool in its oscillations, and a second lever in coupled relation to the first lever for shifting the center of oscillation of the latter in a direction to impart an areal traverse to the tool in its movements along a given plane, substantially as set forth.

41. In combination with a tool oscillating about a given center, means for controlling the movement of the tool along the arc of its oscillations, and additional means in coöperative relation to said controlling means, for shifting the center of oscillation of said tool in a direction transverse to the sine of the arc described by the tool, substantially as set forth.

42. In combination with a reciprocating tool-carrier frame capable of oscillation about a fixed axis, and of oscillation in planes parallel to said axis, suitable means connected to the frame for controlling said reciprocation, and additional means in coöperative relation to the first mentioned means for controlling the oscillatory movements aforesaid, substantially as set forth.

43. In combination with a tool capable of reciprocation in specific directions, means for controlling the tool in said reciprocations, and additional means in coöperative relation to said controlling means for imparting a movement to the tool in a direction transverse to that of the reciprocations aforesaid, substantially as set forth.

44. In combination with a tool capable of reciprocation in specific directions, means for controlling the tool in said reciprocations, and additional means in coöperative relation to said controlling means for simultaneously imparting a movement to the tool in a direction transverse to that of the reciprocations aforesaid, substantially as set forth.

45. In combination with a tool capable of reciprocation in two directions transverse to one another, and in a third direction transverse to one of the aforesaid two directions, of means for mechanically controlling the tool in its movements in the respective directions, substantially as set forth.

46. In combination with a cutting tool, means including two levers for mechanical control of said tool in two directions transverse to one another, the free ends of said levers being adapted to hand operation, the longitudinal axis of said tool being adapted to remain in the same relative position during the movements of said tool in said directions.

47. In combination with a tubular spindle, a tool, adjustable means to attach said tool to one end of said spindle, an adjustable stop for the tube of said spindle and means to hold said stop in its adjusted position for the purpose of endwise adjustment of said tool.

48. In combination with a tubular spindle an adjustable tool, an adjustable stop for said tool, adjusting-means for said stop, projecting through the free end of said spindle, and adapted to be operated without removing the toolholder from the spindle, substantially as set forth.

49. In combination with a tubular spindle, an adjustable tool for said spindle, an adjustable stop for said tool projecting through the free end of said spindle and means for a mechanical control of said spindle substantially as set forth.

50. In a carving machine the combination of a movable toolcarrier, a rotating abrasive tool for said toolcarrier, and controlling means for said toolcarrier to exert a varying pressure on said abrasive tool.

51. In a carving machine a movable toolcarrier, a tool for said tool-carrier, the axis of said tool being adapted to remain in the same relative position, and means including levers for mechanical control of said toolcarrier, the free ends of said levers being adapted to hand operation, substantially as set forth.

In testimony whereof I affix my signature, in presence of two witnesses.

EMIL R. LOCHMAN.

Witnesses:
EMIL STAREK,
MARY D. WHITCOMB.